United States Patent [19]
Cunningham et al.

[11] 3,717,717
[45] Feb. 20, 1973

[54] SHRINKABLE CABLE JOINT SLEEVE, CABLE JOINT EMPLOYING THE SAME, AND METHOD OF FORMING A CABLE JOINT

[75] Inventors: Francis V. Cunningham, Western Springs; John S. Wicks, Glen Ellyn, both of Ill.

[73] Assignee: Joslyn Mfg. and Supply Co., Chicago, Ill.

[22] Filed: April 20, 1970

[21] Appl. No.: 30,056

[52] U.S. Cl. .................174/73 R, 156/49, 174/88 R, 174/DIG. 8
[51] Int. Cl. ...........................................H02g 15/08
[58] Field of Search ..174/DIG. 8, 73 R, 73 SC, 84 R, 174/88 R, 88 C; 156/49, 84, 85, 86

[56] References Cited

UNITED STATES PATENTS

| 3,558,799 | 1/1971 | Lee | 174/73 R |
|---|---|---|---|
| 3,576,387 | 4/1971 | Derby | 174/DIG. 8 |
| 3,612,746 | 10/1971 | Sankey | 174/73 R |
| 3,035,113 | 5/1962 | Danchuk | 174/DIG. 8 |
| 3,210,460 | 10/1965 | Suelmann | 174/DIG. 8 |
| 3,243,211 | 3/1966 | Wetmore | 174/DIG. 8 |
| 3,297,819 | 1/1967 | Wetmore | 174/DIG. 8 |
| 3,317,655 | 5/1967 | Oatess et al. | 174/73 R |
| 3,485,935 | 12/1969 | Kreuger | 174/88 R |

FOREIGN PATENTS OR APPLICATIONS

| 883,155 | 11/1961 | Great Britain | 174/84 R |
|---|---|---|---|
| 1,177,915 | 1/1970 | Great Britain | 174/DIG. 8 |

OTHER PUBLICATIONS

Insulation, August 1969, page 23.

Primary Examiner—Laramie E. Askin
Attorney—Mason, Kolemainen, Rathburn & Wyss

[57] ABSTRACT

A shrinkable cable joint sleeve includes a hollow tube of shrinkable insulating material having tapered end portions and a first conductive shield along its outer surface. The cable joint sleeve is slidably mounted over an end portion of a cable to be spliced or coupled to another cable by a connector. After the cables are spliced or otherwise connected together, the shrinkable cable joint sleeve is moved into position about the connection. Upon the application of a high temperature, the sleeve shrinks and forms an insulated seal for the cable splice with a second conductive shield along a portion of the inner surface of the tube encompassing the connector.

14 Claims, 5 Drawing Figures

PATENTED FEB 20 1973
3,717,717
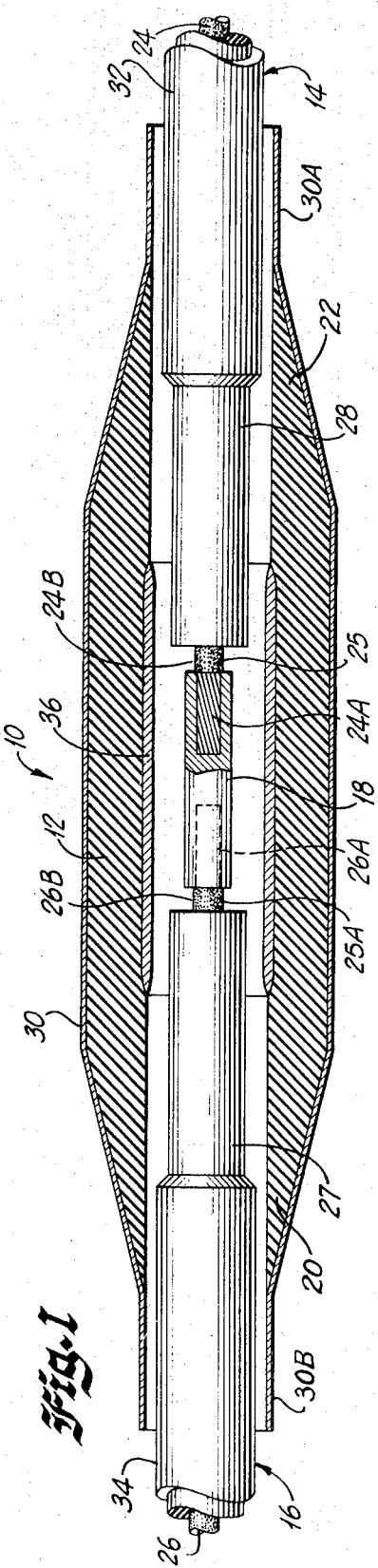
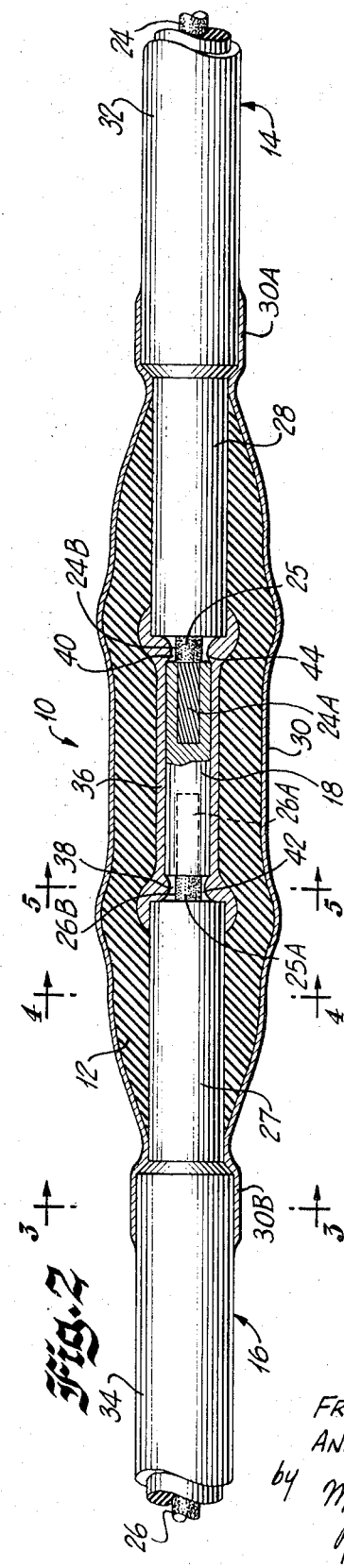
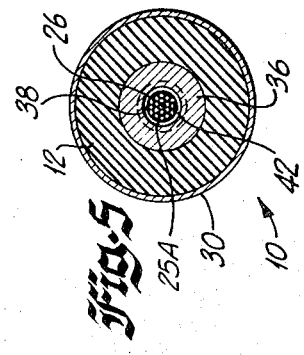
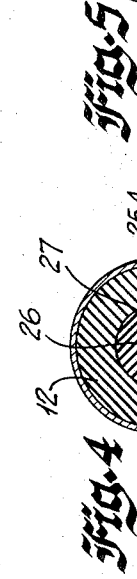
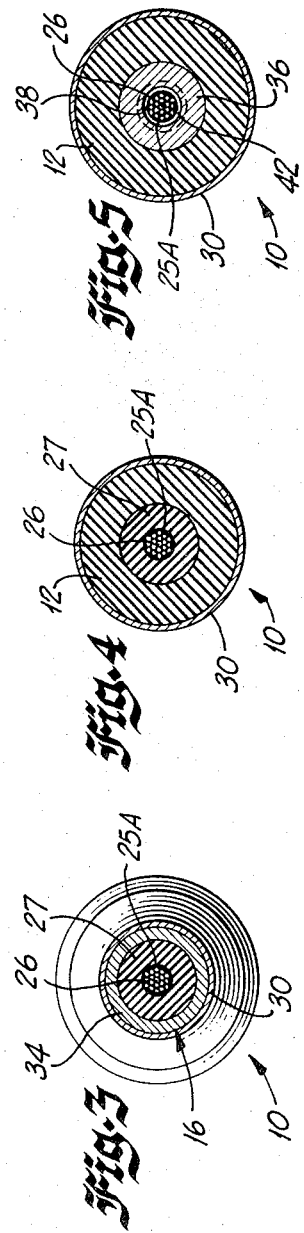
INVENTORS
FRANCIS V. CUNNINGHAM
AND JOHN S. WICKS
by Mason, Kolehmainen,
Rathburn and Wyss
ATTORNEYS.

SHRINKABLE CABLE JOINT SLEEVE, CABLE JOINT EMPLOYING THE SAME, AND METHOD OF FORMING A CABLE JOINT

This invention relates to a shrinkable cable joint sleeve, and more particularly, to a new and improved integral cable joint sleeve assembly that forms an insulated seal about a cable splice suitable for use in an underground electrical system.

The splicing or connecting of insulated power cables in an underground electrical system takes a considerable amount of time. The cables must be properly prepared and connected with an appropriate conductive connector, and then usually wrapped with layers of conducting and insulating tape around the connection. Great care must be taken to protect against corona effects occuring in the air gaps within the layers of the tape. In addition to the considerable wrapping time, the layers of tape greatly increase the size of the splice.

Some elastic material cable joint sleeves have been developed which use interference fits to maintain the insulating seal. However, these cable joint sleeves cannot be fitted to all types of insulated power cables in high voltage underground electrical systems. More recently preformed connectors for underground electrical systems have become available but in many cases are more expensive and cumbersome than desired.

Accordingly, it is an object of the present invention to provide a new and improved cable joint sleeve for underground electrical systems.

Another object of the present invention is to provide a new and improved cable joint sleeve that will provide an easily installed insulated seal for a cable splice or connection in underground electric systems.

A further object of the present invention is to provide a new and improved cable joint sleeve that is only slightly larger in size than the cables being joined.

Briefly, the present invention relates to a new and improved shrinkable cable joint sleeve particularly useful in an underground electric power system. The cable joint sleeve includes a hollow tube of insulating material slidably mountable over the end portions of cables that are to be spliced or coupled by an appropriate connector. The tube has an outer conductive shield along its outer surface and an inner conductive shield along a portion of its inner surface that encompasses the connector when the cable joint sleeve is properly positioned about the cable connection. Upon the application of a relatively high temperature, the sleeve shrinks about the connector and the end portions of the cables to form a shielded, insulated seal for the splice coupling the cables.

In accordance with another aspect of the present invention, the shrinkable cable joint sleeve includes a plurality of concentric tubes or layers of shrinkable or dilateable material. The innermost tube forms a conductive shield about the connector coupling the power cables, and the outermost tube forms a conductive shield for the cable joint sleeve. Between the conductive shields is at least one tube of insulating material which provides the requisite insulation for the cable splice.

For a better understanding of the present invention reference may be had to the accompanying drawings wherein:

FIG. 1 is a cross sectional view of a shrinkable cable joint sleeve assembly encompassing a spliced cable according to the present invention;

FIG. 2 is a cross sectional view of the cable joint sleeve in sealing relation with the cable splice;

FIG. 3 is a cross sectional view of the cable joint taken along the line 3—3 in FIG. 2;

FIG. 4 is a cross sectional view of the cable joint taken along line 4—4 in FIG. 2; and FIG. 5 is a cross sectional view of the cable joint taken along the line 5—5 in FIG. 2.

Referring now more specifically to FIG. 1 of the drawings, therein is illustrated a shrinkable cable joint sleeve which is indicated generally as 10 and which embodies the present invention. The cable joint sleeve 10 includes a hollow tube 12 of shrinkable insulating material that is slidable over an end portion of either cable 14 or 16 that are used in an underground electric system and spliced or connected to each other by a connector 18. When a relatively high temperature is applied to the cable joint sleeve 10, the hollow tube 12 shrinks to form an insulated seal about the splice made between the cables 14 and 16.

More specifically, the hollow tube 12 can be made of any suitably treated or processed insulating material, such as polyolefin, polyvinylchloride, or polytetrafluoroethylene, that has the desirable characteristic of shrinking considerably in size upon the application of a relatively high temperature. The hollow tube 12 has tapered ends 20 and 22 that are slidable over either of the cables 14 or 16. When it is necessary to splice the cables 14 and 16 to each other, an end portion of the insulation on each of the cables 14 and 16 is removed so that the ends 24A and 26A of conductors 24 and 26, respectively, are exposed completely and can be inserted into the connector 18. A small portion 24B or 26B of the conductors 24 and 26, respectively, retains a semi-conducting layer 25 and 25A that insures adequate shielding of the conductors 24 and 26. In addition, a portion of semi-conducting shields 32 and 34 on the cables 14 and 16 is removed so that an insulation section 27 or 28 on each of the cables 16 and 14, respectively, also is exposed.

After the cables 14 and 16 have been prepared, the cable joint sleeve 10 is slid over one of the cables, such as the cable 14, and the connector 18 is installed to electrically couple the conductors 24 and 26. The cable joint sleeve 10 then is properly positioned about the connector 18 and the other cable 16, as illustrated in FIG. 1. If desired, an adhesive can be applied to the inner surface of the tube 12 to aid the proper sealing of the cable joint sleeve 10. As a relatively high temperature is applied to the cable joint sleeve 10, the cable joint sleeve 10 shrinks about the cables 14 and 16, as shown in FIG. 2, both in the radial and longitudinal directions. However, the hollow tube 12 can be processed so that the application of heat causes a great amount of shrinkage in the radial direction, but only a small amount of shrinkage in the longitudinal direction. The relatively high temperature can easily be applied by a portable torch or other suitable heating device so that the tedious wrapping of layers of tape and the like is eliminated.

The outer surface of the tube 12 has a conductive or semi-conductive shield 30 so that the cable joint sleeve 10 can be maintained at a ground potential along with the outer surfaces 32 and 34 of the cables 14 and 16. The shield 30 may include end portions 30A and 30B that extend beyond the longitudinal extremities of the tube 12 to contact the shields 32 and 34 of the cables 14 and 16 after the sleeve 10 has shrunk (FIG. 2) to maintain the shield 30 at the potential of the shields 32 and 34. Along a portion of the inner surface of the tube 12 is an inner conductive or semi-conductive shield 36 that is properly positioned about the connector 18 and the conductor portions 24B and 26B when the tube 12 is positioned about the cables 14 and 16. The shields 30 and 36 shrink from their shapes illustrated in FIG. 1 to their shapes illustrated in FIG. 2 upon the application of heat or upon drying after dilation.

Once the cable joint sleeve 10 has cooled and formed the sealed joint shown in FIG. 2, the inner conductive shield 36 is in contact with the connector 18 and is thereby coupled to the connector 18 so that it is maintained at the line potential of the conductors 24 and 26 and the connector 18. By having the inner conductor shield 36 at the same potential as the conductors 24 and 26, potential gradients are eliminated in air gaps 38, 40, 42, and 44 so that corona is eliminated.

Although the present invention has been described by reference to only a single embodiment thereof, it will be apparent that numerous other modifications and embodiments may be devised by those skilled in the art, and it is intended by the appended claims to cover all modifications and embodiments which will fall within the true spirit and scope of the present invention.

What is claimed as new and desired to be secured by Letters Patent of the United States is:

1. A device for joining the end portions of high voltage cables of the type having a central current-carrying conductor and an outer conductive shield comprising
   an elongated, radially inwardly shrinkable insulating tube,
   a first, elongated, radially inwardly shrinkable conductive member adjacent the central portion of the inner surface of said tube and
   a second, elongated, radially inwardly shrinkable conductive member adjacent the outer surface of said tube.

2. A device as set forth in claim 1 wherein said tube and said first and second members are formed of a dilatable material.

3. A device as set forth in claim 1 wherein said tube and said first and second members are shrinkable upon the application of heat.

4. A device as set forth in claim 1 wherein said second member extends longitudinally beyond the longitudinal extremities of said tube.

5. A device for joining the end portions of high voltage cables of the type having a central current-carrying conductor and an outer conductive shield comprising
   an elongated, radially inwardly shrinkable insulating tube receiving and surrounding said end portions, said central conductors of said end portions being electrically connected together by a conductive means,
   a first, elongated, radially inwardly shrinkable conductive member adjacent the central portion of the inner surface of said tube and overlying said conductive means and
   a second, elongated, radially inwardly shrinkable conductive member adjacent the outer surface of said tube,
   said tube and said first and second members being shrinkable to form a shielded, insulated sealing joint for said end portions.

6. A device as set forth in claim 5 wherein said tube and said first and second members are formed of a dilatable material.

7. A device as set forth in claim 5 wherein said tube and said first and second members are shrinkable upon the application of heat.

8. A device as set forth in claim 5 wherein said second member extends longitudinally beyond the longitudinal extremities of said tube and overlies said shields of said cables so as to conductively contact said shields after shrinking.

9. A method of joining the end portions of high voltage cables of the type having a central current-carrying conductor and an outer conductive shield comprising the steps of
   preparing said end portions for being joined,
   placing an elongated, radially inwardly shrinkable insulating tube; a first, elongated, radially inwardly shrinkable conductive member adjacent the central portion of the inner surface of said tube; and a second, elongated, radially inwardly shrinkable conductive member adjacent the outer surface of said tube over one of the prepared end portions,
   conductively connecting said central conductors of said end portions,
   positioning said tube and said first and second members over said connected central conductors and
   shrinking said tube and said first and second members over said connected central conductors so as to form a sealed joint for said end portions.

10. A method as recited in claim 9 wherein the step of shrinking said tube and said first and second members comprises applying heat to said tube and said first and second members to cause said tube and said first and second members to shrink and to thereby form a sealed joint for said end portions.

11. A method as recited in claim 9 further comprising the step of dilating said tube and said first and second members before placing said tube and said first and second members over one of the prepared end portions.

12. A method of joining the end portions of high voltage cables of the type having a central current-carrying conductor and an outer conductive shield comprising the steps of
   preparing said end portions for being joined,
   placing a first, elongated, radially inwardly shrinkable conductive member; an elongated, radially inwardly shrinkable insulation tube; and a second, elongated, radially inwardly shrinkable conductive member over one of the prepared end portions,
   conductively connecting said central conductors of said end portions with a connecting means,
   shrinking said first member so that it conductively contacts said connecting means, said tube so that it contacts said first member and said end portions, and said second member so that it contacts said tube and the shields of said cables to thereby form a sealed joint for said end portions.

13. A method as recited in claim 12 wherein the step of shrinking said tube and said first and second members comprises applying heat to said tube and said first and second members to cause said tube and said first and second members to shrink to thereby form a sealed joint for said end portions.

14. A method as recited in claim 12 further comprising the step of dilating said tube and said first and second members before placing said tube and said first and second members over one of the prepared end portions.

* * * * *